United States Patent [19]
Nilsson

[11] Patent Number: 6,062,547
[45] Date of Patent: May 16, 2000

[54] QUENCH VESSEL FOR RECOVERING CHEMICALS AND ENERGY FROM SPENT LIQUORS

[75] Inventor: Bengt Nilsson, Skoghall, Sweden

[73] Assignee: Kvaerner Pulping AB, Karlstad, Sweden

[21] Appl. No.: 09/096,506

[22] Filed: Jun. 12, 1998

Related U.S. Application Data

[63] Continuation-in-part of application No. 08/764,603, Dec. 11, 1996, abandoned.

[30] Foreign Application Priority Data

Jun. 22, 1994 [SE] Sweden ................................... 9402197
Jun. 15, 1995 [WO] WIPO ...................... PCT/SE95/00586
Apr. 24, 1997 [SE] Sweden ................................... 9701546
Apr. 7, 1998 [WO] WIPO ...................... PCT/SE98/00637

[51] Int. Cl.[7] ...................................................... B01F 3/04
[52] U.S. Cl. ......................... 261/108; 261/110; 162/30.1; 55/342; 422/207; 422/227
[58] Field of Search ............................... 162/30.1, 30.11, 162/31; 55/342, 392, 397; 422/172, 185, 207, 227, 228; 261/108, 110

[56] References Cited

U.S. PATENT DOCUMENTS

| | | | |
|---|---|---|---|
| 4,328,008 | 5/1982 | Muenger | 48/197 R |
| 4,808,264 | 2/1989 | Kignell | 162/30.1 |

FOREIGN PATENT DOCUMENTS

| | | |
|---|---|---|
| 459962 A1 | 12/1991 | European Pat. Off. . |
| 448 173 | 1/1987 | Sweden . |
| 470516 | 6/1994 | Sweden . |
| WO94/20677 A1 | 8/1994 | WIPO . |
| WO95/35410 A1 | 12/1995 | WIPO . |

*Primary Examiner*—Dean T. Nguyen
*Attorney, Agent, or Firm*—Jeffrey S. Melcher

[57] ABSTRACT

Provided is a quench vessel containing at least two separate internal vessels. A receiving liquor is contained in the first internal vessel and a washing liquid bath is contained in a second internal vessel.

18 Claims, 3 Drawing Sheets

QUENCH VESSEL FOR RECOVERING CHEMICALS AND ENERGY FROM SPENT LIQUORS

This application is a continuation-in-part of U.S. patent application Ser. No. 08/764,603, filed on Dec. 11,1996, now abandoned, the complete disclosure of which is incorporated herein by reference. This application also claims priority to the following applications, the complete disclosures of which are incorporated herein by reference: PCT/SE95/00586, filed Jun. 15,1995; and PCTSE98/00637, filed Apr. 7, 1998, Swedish Patent Application SE9701546 filed Jun. 24, 1997, and Swedish Patent Application SE 9402197-9, filed Jun. 22, 1994.

FIELD OF THE INVENTION

The present invention relates to a quench vessel for recovering chemicals and energy from spent liquors which are obtained during pulp production by chemical delignification of fiber raw material. More particularly, the invention relates to a quench vessel for separating alkali metal salts from gasified black liquor.

BACKGROUND OF THE INVENTION

When pulp is produced in accordance with the sulphate method, a spent liquor, generally termed black liquor, is obtained which contains organic material and the residual chemicals which have been used to cook the fiber raw material. In general, this black liquor is evaporated and conveyed to a separate process for recovering the energy content of the organic material and recovering the cooking chemicals as so-called green liquor. The well-known Tomlinson process has been the commercially dominant method used for this recovery of energy and chemicals. However, a disadvantage of this process, which is now very old, is that it requires very large combustion ovens that are complicated both from the technical point of view and in regards to their operation.

Published Swedish patent application SE 448 173 describes a more recent process that utilizes simplified process equipment and achieves an improved recovery of both energy and chemicals. This process is based on a pyrolysis reaction in which the black liquor is gasified in a reactor, resulting in the formation of an energy-rich gas, principally comprising carbon monoxide, carbon dioxide, methane, hydrogen and hydrogen sulphide, and inorganic chemicals in the form of small drops of smelt, principally comprising sodium carbonate, sodium hydroxide, and sodium sulphide. The resulting mixture of gas and smelt drops is rapidly cooled by means of direct contact with a cooling liquid, usually water and green liquor that is formed when the smelt chemicals dissolve in the cooling liquid. The gas is subsequently washed in a gas-washing apparatus of the scrubber type. The gas is then used as a fuel for generating steam and/or electric power. The physical caloric value of the gas can also be utilized when the gas is cooled down from the gasification temperature to the saturation temperature for aqueous steam at the selected pressure. At a saturation temperature of 252° C., corresponding to 40 bar, for example, steam having a pressure of 3 to 8 bar can be generated when the green liquor is cooled and when the gas is cooled and its water content is condensed downstream of the gas-washing tower.

Nevertheless, this process too, despite being appreciably simpler and smoother than the Tomlinson process, still leaves room for improvement. For example, unwanted carbonate and hydrogen carbonate is formed in the green liquor when carbon dioxide in the pyrolysis gas comes into contact with the green liquor when the gas and smelt droplets are quenched and dissociated in the aqueous solution of the first stage. Therefore, the pH of the green liquor is decreased. It also leads to the undesirable formation of $H_2S$ which usually must be separated from the desirable gases.

In addition, extremely small, virtually hydrophobic, particles usually remain in the gas when it leaves the gas-washing apparatus because the gas-washing apparatus according to SE 448,173 is not capable of effectively separating them. A further disadvantage is that the recovery of energy from the physical caloric value of the gas cannot be carried out in a manner which is optimal for producing high-quality process steam. Instead, only steam of relatively moderate pressure that can be produced.

Consequently, there is a need for a quench which minimizes the formation of undesirable hydrogen carbonate and is effective at removing small, hydrophobic particles from the combustion gas.

SUMMARY OF THE INVENTION

An objective of the present invention is to provide a quench vessel having improved cooling ability that minimizes the formation of undesirable compounds, such as hydrogen carbonate, and which is effective at removing small, hydrophobic particles from the combustion gas.

Provided is a novel quench vessel for preparing an aqueous solution of alkaline compounds from a combustion gas containing carbon monoxide, carbon dioxide, hydrogen and entrained alkaline compounds, which combustion gas has been formed during partial combustion of a cellulose spent liquor in a gas generator connected to the quench vessel. The quench vessel comprises:

a walled structure defining an internal volume and having an inlet constructed and arranged to be in fluid communication with a gas generator whereby combustion gas can flow from the generator through the inlet and into the internal volume;

separating structure disposed within the internal volume which defines separate first and second internal vessels within the internal volume;

cooling structure constructed and arranged for contacting the combustion gas with an aqueous cooling media to form a mixture of steam and cooled combustion gas;

compound separating structure disposed in the internal volume to separate the alkaline compounds from the cooled combustion gas to form an alkaline-reduced gas, the compound separating structure comprising a walled compound separating structure defining a space in fluid contact with the inlet and through which the cooled combustion gas passes, the cooling structure being disposed within the space defined by the walled compound separating structure, the walled compound separating structure being constructed and arranged such that the separated alkaline compounds fall into a receiving liquor contained in the first internal vessel, the receiving liquor being formed at least in part from the separated alkaline compounds, the walled compound separating structure having an opening through which the cooled combustion gas passes that is disposed above a surface of the receiving liquor;

quenching structure to quench the alkaline-reduced gas with an aqueous washing bath, the quenching structure comprising a walled quenching structure defining a down-coming cavity fluidly connected to the opening of the walled compound separating structure and opening below a surface of the aqueous washing bath contained in the second internal vessel such that the alkaline-reduced gas is forced to pass down through a surface of the aqueous washing bath to produce a quenched, alkaline-reduced gas, the walled quenching structure being constructed and arranged such that the quenched, alkaline-reduced gas exits the aqueous washing bath outside the down-coming cavity and flows into a portion of the internal volume disposed above the aqueous washing bath and outside of the down-coming cavity; and an outlet from the portion of the internal volume through which the quenched, alkaline-reduced gas can exit the internal volume.

DETAILED DESCRIPTION OF THE INVENTION

Figure 1:
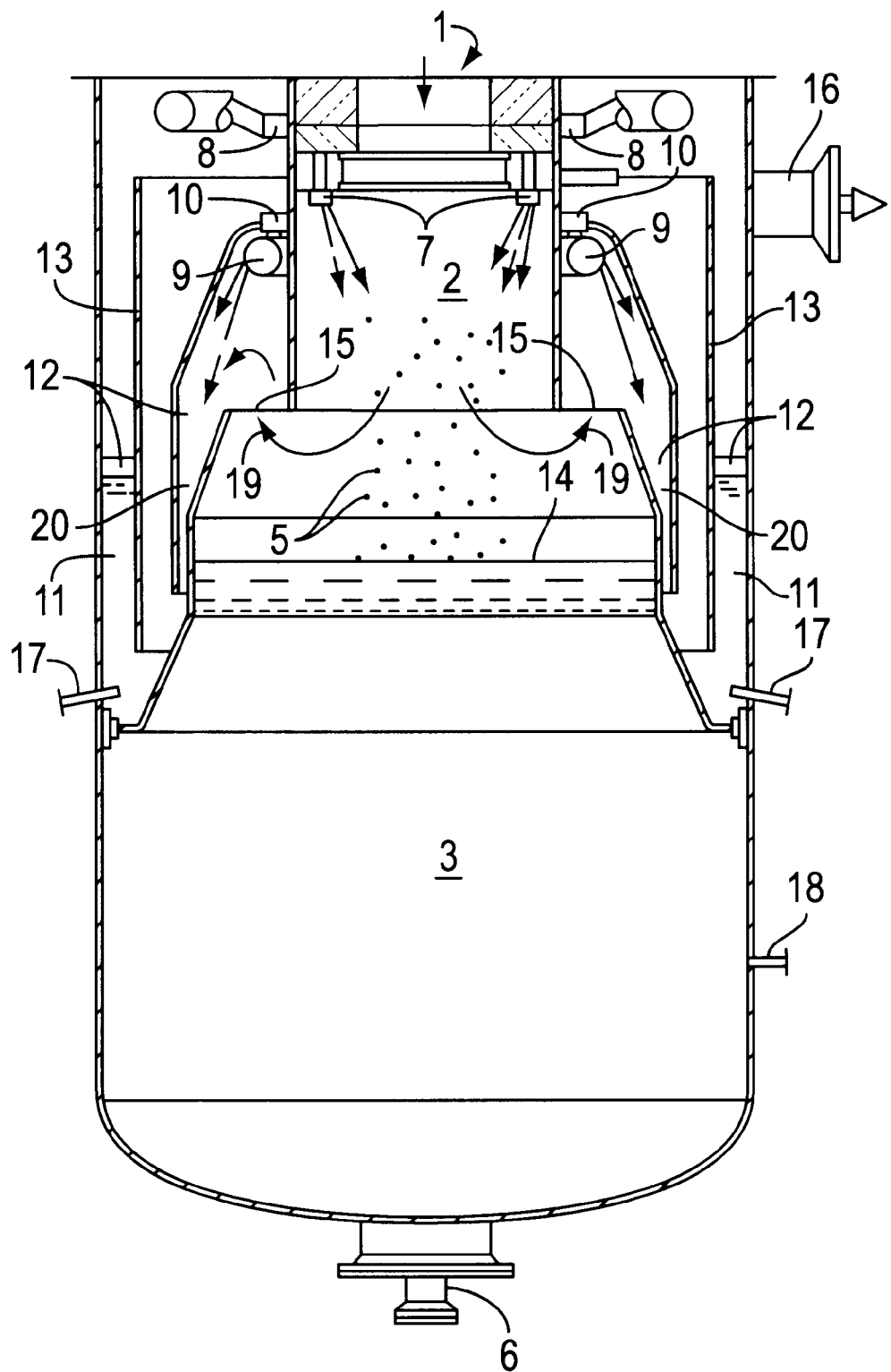
FIG. 1 shows a quench vessel according to the invention in which separate cooling stages for the smelt and gas are provided within the quench vessel.

As disclosed herein, the term "receiving liquor" relates to an aqueous liquid containing dissolved alkali metal salts, such as green liquor or white liquor.

As disclosed herein, the term "aqueous cooling media" relates to steam and/or an aqueous liquid substantially free from alkali metal ions, such as a condensate from a countercurrent condenser or a sulphur-containing condensate from evaporation of spent liquor. Several different types of cooling media may be used at the same time. Examples of suitable cooling media include fresh water, condensates, and steam.

As disclosed herein, the term "aqueous washing liquid" relates to an aqueous liquid which preferably comprises a condensate from indirect cooling. The term "aqueous washing bath" is at least partially formed from the aqueous washing liquid and can include other aqueous liquids.

As disclosed herein, the term "combustion gas" relates to the hot mixture of gases and salt smelt leaving the gasifier and entering the quench vessel.

All pressure values in the following description and the appended claims refer to absolute values, bar(atm).

The following equilibrium reactions in the quench are of special importance for the composition of the aqueous solution of alkali metal salts produced according to the present invention.

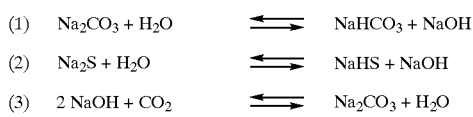

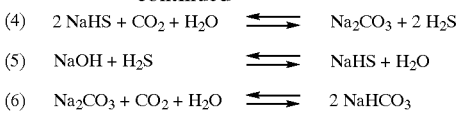

By contacting a process gas containing carbon dioxide with an alkaline solution using prior art quench vessels, the gas tends to absorb into the solution and the resulting pH value of green liquor is decreased.

In accordance with reactions (1) and (6), alkali is partly converted to alkali hydrogen carbonate, which is a highly undesirable compound in green liquor as it places an extra load on the causticizing system. Twice as much lime is required for conversion of alkali hydrogen carbonate to hydroxide compared to conversion from alkali carbonate.

The concept behind the quench vessel which has been devised is to bring about the possibility of producing green liquor and/or white liquor without unnecessarily forming hydrogen carbonate in the liquor, and unwanted hydrogen sulfide being formed in the gas.

The principle is that the combustion gas leaving the reactor is cooled by means of direct contact with one or more aqueous cooling media, causing solidification or partial solidification of the alkaline salts, to form a mixture of steam and cooled combustion gas. The temperature of the mixture should be above the steam saturation temperature at the prevailing pressure in the quench vessel. The alkaline salts are separated from the cooled combustion gas and fall into the receiving liquor, to form an alkaline-reduced gas. Extensive contact between the combustion gas and the receiving liquor is avoided to the greatest extent possible.

According to the present invention, the reaction between carbon dioxide and sodium carbonate (reaction (6) above) in the combustion gas is substantially reduced, and the reaction between carbon dioxide and sodium hydroxide (reaction (3) above) in the receiving liquor is substantially reduced. Furthermore, the reaction between carbon dioxide and sodium hydrogen sulfide (reaction (4) above) is substantially reduced. Moreover, hydrogen sulfide desorption from the reaction between sodium hydrogen carbonate and sodium hydrogen sulfide is substantially avoided. Preferably, the sodium hydroxide that has been formed in the receiving liquor is not converted to sodium carbonate, since sodium hydroxide is the desired final product following causticizing of the green liquor. During causticizing, sodium carbonate is converted to sodium hydroxide by reacting with slaked lime.

Figure 2:
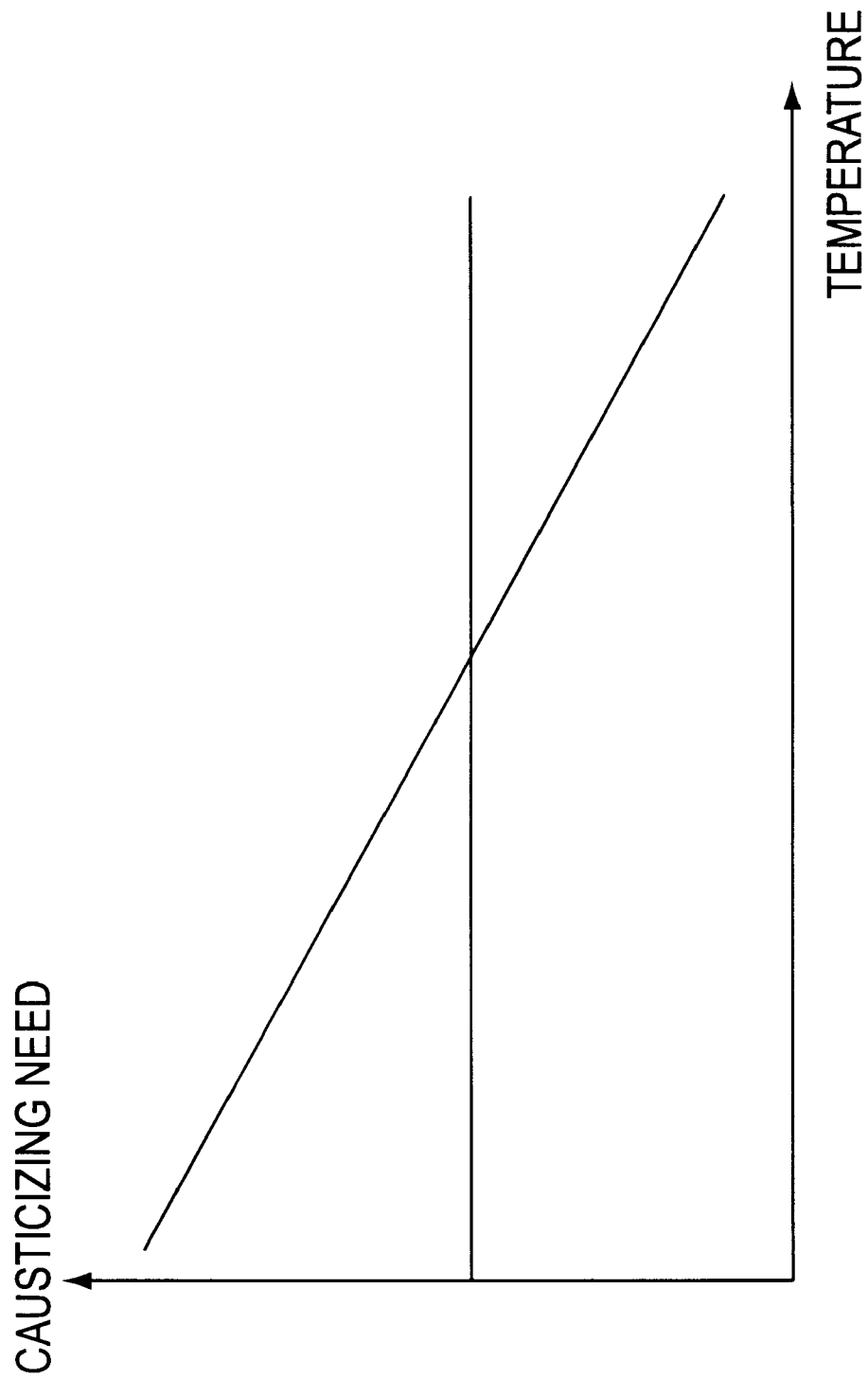
FIG. 2 is a simplified sketch illustrating the need of causticizing the salts of green liquor produced by gasifying spent liquor as a function of the degree of superheating in the zone where the salt particles are separated from the gaseous compounds in the combustion gas.

The need of causticizing of green liquor produced according to the present invention is illustrated in FIG. 2. FIG. 2 discloses a simplified sketch showing the need for causticizing the produced green liquor as a function of the temperature in a quench region where the alkali metal salts are separated from the combustion gas to form an alkaline-reduced gas.

The alkaline-reduced gas is then quenched in a second stage, which is configured so that a high degree of contact is achieved between the alkaline-reduced gas and the aqueous washing bath. Since the majority of the alkali metal salts were separated from the alkaline-reduced gas in the first stage, the above mentioned equilibrium reactions cannot occur in the second stage, and thus the intense contact between alkaline-reduced gas and aqueous washing bath does not result substantially formation of undesired compounds.

The alkaline-reduced gas is quenched by forcing the alkaline-reduced gas down into the aqueous washing bath and then allowing the alkaline-reduced gas to bubble up through the aqueous washing bath, which principally comprises an aqueous washing liquid, to form a quenched, alkaline-reduced gas that is saturated with moisture.

FIG. 1 discloses a preferred embodiment of the present invention. Spent liquor is gasified in a gasification reactor (1), that is preferably ceramically lined. The gasification reactor (1) is provided with an inlet for black liquor (not shown) and an inlet for oxygen or oxygen-containing gas (not shown), and a burner (not shown). The temperature of the gasification reactor is usually maintained within the range of about 500° C. to about 1600° C., preferably about 800° C. to about 1200° C. The pressure in the gasification reaction is usually maintained in the range of from about 1 to about 150 bar. There are generally two separate kinds of gasification processes, namely low-pressure (or atmospherical) gasification or high-pressure (or pressurized) gasification. Low-pressure gasification, such as typically used in a sulphide reactor, is usually carried out at about 0.5 to about 05 bar, preferably from about 1.5 to about 3 bar. High pressure gasification, such as typically used in a green liquor reactor, is usually carried out at from about 1.5 to about 150 bar, preferably about 10 to about 80 bar, and most preferably from about 25 to about 40 bar. The high pressure gasification process is preferred over the low pressure gasification process.

The bottom of the reactor is fluidly connected to an opening in the quench vessel (1). The quench vessel contains a compound separating structure, such as a down-coming tube (2), through which the combustion gas must pass. The opening (19) of the compound separating structure opens above the resting surface of a receiving liquor (14) in a first internal vessel (3). The opening (19) is preferably at least about 0.5 m, more preferably at least about 0.7 m and most preferably at least about 1.0 m above the resting surface of the receiving liquor, to substantially avoid contact of the combustion gas with the receiving liquor (14). One or more aqueous cooling media are contacted with the combustion gas in the compound separating structure (2) using a cooling structure, such as at least one nozzle (7), by injecting the cooling media into the combustion gas to form a mixture of steam and cooled combustion gas. The aqueous cooling media can be supplied to the nozzle (7) using the conduit (8).

The aqueous cooling media should be injected at a pressure above the prevailing pressure in the compound separating structure (2). The cooling structure should be constructed and arranged such that the temperature of the resulting mixture formed by the injected cooling medium and the combustion gas remains superheated in order to prevent dissociation of the alkaline salts and undesirable formation of carbonates and hydrogen carbonates. The mixture temperature preferably is lower than the smelt temperature of the alkali metals in order enable the smelt to solidify or partially solidify to form sufficiently sized drops of smelt before reaching the surface of the receiving liquor (14). The compound separating structure is constructed such that when droplets of cooled smelt are formed they fall or are carried by superheated steam into the receiving liquor. Preferably the mixture temperature is within the range of from about 250° C. to about 600° C., more preferably from about 250° C. to about 600° C., and most preferably from about 250° C. to about 400° C., when high pressure gasification is conducted. However, when the pressure in the down-coming tube (2) is atmospheric the temperature of the mixture of the cooling medium and combustion gas in the down-coming tube (2) are preferably in the range of about 150° C. to about 800° C., preferably from about 150° C. to about 600° C., and most preferably from about 150° C. to about 400° C.

The injected aqueous cooling media can at least partially be in liquid state, provided that the resulting mixture is superheated. The cooling effect is stronger if a liquid cooling medium is injected because evaporation of the liquid requires energy. Based on the disclosure provided herein, one skilled in the art will be able to provide suitable cooling structure to inject cooling medium into the combustion gas to provide a desired mixture of superheated steam and cooled combustion gas. In some cases it may be advantageous to inject a minimal amount of cooling medium, especially when the gasification is carried out at a relatively low temperature or when a higher degree of superheating is desired.

Preferably, the cooling structure is constructed to inject the cooling medium perpendicularly in relation to a direction the combustion gas stream flows through the compound separating structure. However, if desired the cooling structure can be constructed to inject the cooling medium tangentially in order to create a rotational movement. In an alternative embodiment, the cooling medium is introduced into a space, such as annulus or tubes, around the gasification reactor in order to cool the gasification reactor before being supplied to the combustion gas.

The solidified or partially solidified smelt particles (5) are moved downwards by the steam and fall into the receiving liquor by means of gravity where they at least partially dissolve in the receiving liquor (14), to form an alkaline-reduced gas. The concentration of the receiving liquor in the first internal vessel (3) can be controlled by adding water or a suitable aqueous solution through conduit (18) and transporting receiving liquor away through conduit (6).

The cooled combustion gas is passed through at least one opening (15) after the down-coming tube opening (19) and an alkaline-reduced gas is formed when the smelt particles fall out of the cooled combustion gas into the receiving liquor (14). The outlet (15) is preferably arranged at least about 0.5 m, preferably about 0.7 m, and most preferably about 1 m downwards from nozzle (7) in order to obtain a suitable level of smelt drops and superheating of steam within the down-coming tube (2).

The alkaline-reduced gas is subsequently quenched, cooled and saturated with moisture in a quenching structure after passing through opening (15). The alkaline-reduced gas is forced down into an aqueous washing bath (11), that is located in a second internal vessel (12). A wall structure (13) defines a down-coming cavity (20) that extends below the surface of the aqueous washing bath (11) such that the alkaline-reduced gas is forced below the surface of the aqueous washing bath(11), around the bottom of the wall (13) and then bubbles up and out of the aqueous washing bath (11) into an internal space located above the aqueous washing bath (11) and outside of the down-coming cavity (20), to form a quenched, alkaline-reduced gas. Preferably, the second internal vessel (12) surrounds at least a portion of the internal vessel, as shown in FIG. 1. If desired, a plurality of vessels and aqueous washing baths can be provided through which the alkaline-reduced gas is quenched. In FIG. 1, the wall (13) extends down to about 200 mm above a walled surface defining a bottom the down-coming cavity.

Aqueous washing liquid can be introduced into the second internal vessel (12) by at least one conduit (10). Preferably, the alkaline-reduced gas is further cooled by spraying aqueous washing liquid into the alkaline-reduced gas using a second cooling structure, such as at least one nozzle (9), before the alkaline-reduced gas enters the aqueous washing bath (11). Preferably, the second cooling structure is constructed such that the aqueous washing liquid travels into the second internal vessel (12) and does not dilute the receiving liquor present in the first internal vessel. When the alkaline-reduced gas passed through the second internal vessel (12) an intense contact with the aqueous washing bath (11) is obtained. The quenched, alkaline-reduced gas exits the second internal vessel via conduit (16) together with at least a part of the aqueous washing liquid. The level of the aqueous washing bath in the second internal vessel can be maintained by removing or adding one or more aqueous liquids via conduit (17) and/or adding aqueous washing liquid via nozzle (9).

Figure 3:
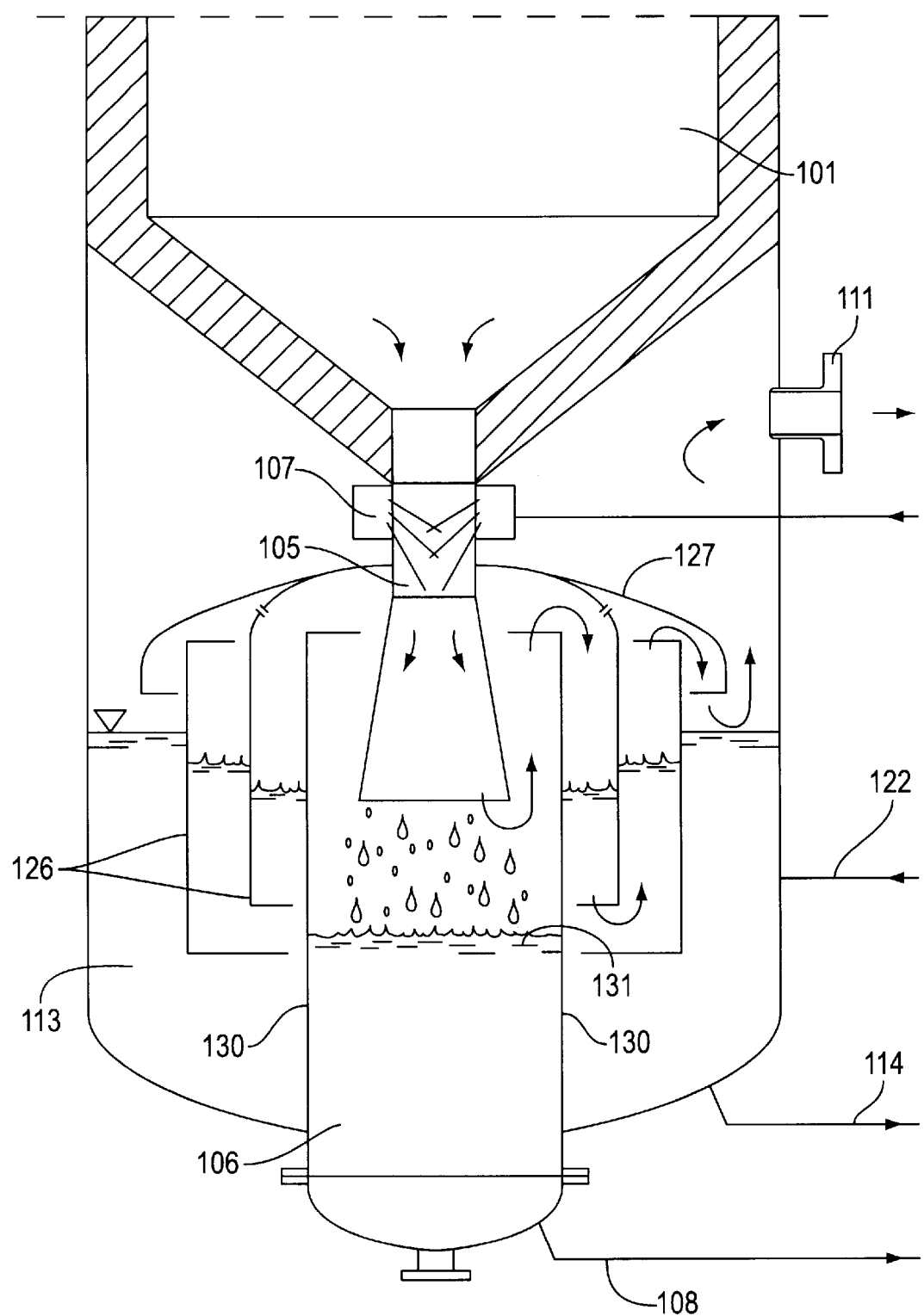
FIG. 3 shows a quench vessel according to the invention in which separate cooling stages for the smelt and gas are provided within the quench vessel.

Another possibility of accommodating at least two cooling stages in the quench vessel according to present invention is shown in FIG. 3. Two separate internal vessels are shown at (106) and (113). The first internal vessel (106) contains a receiving liquor (131) and is located around the centre of the vertical axis of an upright vessel containing a gasification reactor (101). The combustion gas entering the quench vessel is first cooled by the cooling structure (107) to a temperature above the steam saturation temperature in a compound separating structure, such as a down-coming tube (105), to form a mixture of steam and cooled combustion gas. The opening of the down-coming tube (105) is located above the surface of the receiving liquor (131). The alkaline particles fall out of the cooled combustion gas and into the receiving liquor (131) to form an alkaline-reduced combustion gas. The alkaline-reduced combustion gas passes over the surface of the receiving liquor (131) and is then forced to pass through an aqueous washing bath located in the second internal vessel (113), which is located around the periphery of the first internal vessel (106). The two liquid baths are completely separated from each other by an intermediate wall (130) of the first internal vessel (106). The level of the receiving liquor in the first internal vessel (106) can be adjusted by removing receiving liquor via conduit 108. The level of the aqueous washing bath in the second internal vessel (113) can be adjusted by adding liquid via conduit (122) or removing liquid via conduit (114). A plurality of concentrically arranged walls (126), extend down into the aqueous washing bath (113) and serve, together with a diverter screen (127), as a multi stage mammoth pump for forcing of the alkaline-reduced gas through the aqueous washing bath to form a quenched, alkaline-reduced gas. The quenched, alkaline-reduced gas can exit the quench vessel via outlet (111).

The liquid baths (11) or (113) usually comprise water in the form of condensate. However, if desired the liquid baths (11) or (113) can comprise a second liquor, such as a green liquor, having a different composition than the receiving liquors (14) or (131). In this case, the second liquor will usually contain greater amounts of sodium hydrogen carbonate and sodium hydrogen sulfide caused by the intimate contact between a combustion gas containing alkaline salts. Such a liquor containing sodium hydrogen carbonate and sodium hydrogen sulfide can be used for subsequent extracting of $H_2S$ and $CO_2$ from the combustion gas.

The present invention can be applied to recovery of chemicals and energy from different types of spent liquors, for example bleaching plant spent liquors, spent liquors from the production of semi-chemical pulp, for example CTMP, or spent liquors from pulp process based on potassium as the base in place of sodium.

The invention will now be further illustrated by the following example. Example.

EXAMPLE

Gasified black liquor was quenched using a quench vessel according to the present invention as shown in FIG. 1. Combustion gas were directed to a down-coming tube ending 1 m above the resting surface of a receiving liquor. The temperature of the combustion gas was 950° C. and the pressure was 32 bar. Condensate, as cooling media, was injected into the combustion gas, shown at 7, followed by moist saturated steam at a pressure of 40 bar at 250° C. As the cooling media was injected into the combustion gas, the temperature of the resulting superheated mixture became 410° C. The superheated steam and gaseous compounds were let out through the down-coming tube to a second quenching step. The solidified smelt or partially solidified salt particles were separated from the gas stream by means of gravity and subsequently dissolved in the receiving liquor to form a green liquor. The results are disclosed in Table 1 below.

COMPARATIVE EXAMPLE

Gasified black liquor was quenched according to the teachings of published Swedish Patent Application C-448, 173. The gasification process was performed in the same manner as in the Example. The results are disclosed in Table 1.

| Component (grams/liter counted as NaOH) | Example | Comparative Example |
| --- | --- | --- |
| $NaHCO_3$ | 0 | 40 |
| $Na_2CO_3$ | 105 | 108 |
| NaHS | 15 | 12 |
| NaOH | 40 | 0 |
| Total | 160 | 160 |

The results show that green liquor produced according to the present invention is more alkaline than green liquor produced according to the method of the state-of-the-art. Causticizing of the green liquor of the state-of-the-art requires 120% more slaked lime than the green liquor produced in a quench vessel according to the present invention.

What is claimed is:

1. A quench vessel for preparing an aqueous solution of alkaline compounds from a combustion gas containing carbon monoxide, carbon dioxide, hydrogen and entrained alkaline compounds, which combustion gas has been formed during partial combustion of a cellulose spent receiving liquor in a gas generator connected to said quench vessel, said quench vessel comprising:

a walled structure defining an internal volume and having an inlet constructed and arranged to be in fluid communication with a gas generator whereby combustion gas can flow from said generator through said inlet and into said internal volume;

separating structure disposed within said internal volume which defines separate first and second internal vessels within said internal volume;

cooling structure constructed and arranged for contacting said combustion gas with an aqueous cooling media to form a mixture of steam and cooled combustion gas;

compound separating structure disposed in said internal volume to separate said alkaline compounds from said cooled combustion gas to form an alkaline-reduced gas, said compound separating structure comprising a walled compound separating structure defining a space in fluid contact with said inlet and through which said cooled combustion gas passes, said cooling structure being disposed within said space defined by said walled compound separating structure, said walled compound separating structure being constructed and arranged such that said separated alkaline compounds fall into a receiving liquor contained in said first internal vessel, said receiving liquor being formed at least in part from said separated alkaline compounds, said walled compound separating structure having an opening through which said cooled combustion gas passes that is disposed above a surface of said receiving liquor;

quenching structure to quench said alkaline-reduced gas with an aqueous washing bath, said quenching structure comprising a walled quenching structure defining a down-coming cavity fluidly connected to said opening of said walled compound separating structure and opening below a surface of said aqueous washing bath contained in said second internal vessel such that said alkaline-reduced gas is forced to pass down through a surface of said aqueous washing bath to produce a quenched, alkaline-reduced gas, said walled quenching structure being constructed and arranged such that said quenched, alkaline-reduced gas exits said aqueous washing bath outside said down-coming cavity and flows into a portion of said internal volume disposed above said aqueous washing bath and outside of said down-coming cavity; and an outlet from said portion of said internal volume through which said quenched, alkaline-reduced gas exits said internal volume.

2. A quench vessel according to claim 1, wherein said second internal vessel surrounds at least an upper portion of said first internal vessel.

3. A quench vessel according to claim 1, wherein said walled compound separating structure comprises a down-coming tube in fluid contact with said inlet and opening above said surface of said receiving liquor.

4. A quench vessel according to claim 1, wherein said cooling structure comprises at least one nozzle constructed and arranged to inject said aqueous cooling media into combustion gas located within said compound separating structure.

5. A quench vessel according to claim 1, wherein said nozzle is constructed and arranged to inject said aqueous cooling media perpendicularly in relation to a direction the combustion gas flows through said compound separating structure.

6. A quench vessel according to claim 1, wherein said nozzle is constructed and arranged to inject said aqueous cooling media tangentially in relation to a direction the combustion gas flows through said compound separating structure to provide a rotational movement in said combustion gas.

7. A quench vessel according to claim 1, further comprising second cooling structure constructed and arranged within said down-coming cavity for contacting said alkaline-reduced gas with an aqueous washing liquid prior to said alkaline-reduced gas contacting said aqueous washing bath and being constructed and arranged to avoid diluting said receiving liquor with said aqueous washing liquid.

8. A quench vessel according to claim 7, wherein said second cooling structure comprises at least one nozzle constructed and arranged to spray said aqueous washing liquid into said alkaline-reduced gas located within said down-coming cavity.

9. A quench vessel according to claim 1, wherein said opening of said walled compound separating structure is at least about 0.5 meters above said surface of said receiving liquor.

10. A quench vessel according to claim 1, wherein said opening of said walled compound separating structure is at least about 0.7 meters above said surface of said receiving liquor.

11. A quench vessel according to claim 1, wherein said opening of said walled compound separating structure is at least about 1 meter above said surface of said receiving liquor.

12. A quench vessel according to claim 1, wherein a nozzle for supplying said first aqueous cooling media into contact said combustion gas is at least about 0.5 meters from said opening of said walled compound separating structure.

13. A quench vessel according to claim 1, wherein a nozzle for supplying said first aqueous cooling media into contact said combustion gas is at least about 0.7 meters from said opening of said walled compound separating structure.

14. A quench vessel according to claim 1, wherein a nozzle for supplying said first aqueous cooling media into contact said combustion gas is at least about 1 meter from said opening of said walled compound separating structure.

15. A quench vessel for preparing an aqueous solution of alkaline compounds from a combustion gas containing carbon monoxide, carbon dioxide, hydrogen and entrained alkaline compounds, which combustion gas has been formed during partial combustion of a cellulose spent receiving liquor in a gas generator connected to said quench vessel, said quench vessel comprising:

a walled structure defining an internal volume and having an inlet constructed and arranged to be in fluid communication with a gas generator whereby combustion gas can flow from said generator through said inlet and into said internal volume;

separating structure disposed within said internal volume which defines separate first and second internal vessels within said internal volume;

cooling structure constructed and arranged for contacting said combustion gas with an aqueous cooling media to form a mixture of steam and a cooled combustion gas;

a compound separating structure disposed in said internal volume to separate said alkaline compounds from said cooled combustion gas to form an alkaline-reduced gas, said compound separating structure comprising a down-coming tube in fluid contact with said inlet and through which said cooled combustion gas passes, said cooling structure being disposed within a space defined by said down-coming tube, said down-coming tube being constructed and arranged such that said separated alkaline compounds fall into a receiving liquor contained in said first internal vessel, said receiving liquor being formed at least in part from said separated alkaline compounds, said down-coming tube having an opening through which said cooled combustion gas passes that is disposed above a surface of said receiving liquor;

quenching structure to quench said alkaline-reduced gas with an aqueous washing bath, said quenching structure comprising a walled quenching structure defining a down-coming cavity fluidly connected to said opening of said walled compound separating structure and opening below a surface of said aqueous washing bath contained in said second internal vessel such that said alkaline-reduced gas is forced to pass down through a surface of said aqueous washing bath to produce a quenched, alkaline-reduced gas, said walled quenching structure being constructed and arranged such that said quenched, alkaline-reduced gas exits said aqueous washing bath outside said down-coming cavity and flows into a portion of said internal volume disposed above said aqueous washing bath and outside of said down-coming cavity;

second cooling structure constructed and arranged within said down-coming cavity for contacting said alkaline-reduced gas with an aqueous washing liquid prior to said alkaline-reduced gas contacting said aqueous washing bath and being constructed and arranged to avoid diluting said receiving liquor with said aqueous washing liquid; and an outlet from said portion of said internal volume through which said quenched, alkaline-reduced gas exits said internal volume.

16. A quench vessel according to claim 15, wherein said second cooling structure comprises at least one nozzle constructed and arranged to inject said aqueous washing liquid into said alkaline-reduced gas located within said down-coming cavity.

17. A quench vessel according to claim 15, wherein said opening of said down-coming tube is at least about 0.5 meters above said surface of said receiving liquor.

18. A quench vessel for preparing an aqueous solution of alkaline compounds from a combustion gas containing carbon monoxide, carbon dioxide, hydrogen and entrained alkaline compounds, which combustion gas has been formed during partial combustion of a cellulose spent receiving liquor in a gas generator connected to said quench vessel, said quench vessel comprising:

a walled structure defining an internal volume and having an inlet constructed and arranged to be in fluid communication with a gas generator whereby combustion gas can flow from said generator through said inlet and into said internal volume;

separating structure disposed within said internal volume which defines separate first and second internal vessels within said internal volume, said second internal vessel surrounding at least a portion of said first internal vessel;

cooling structure constructed and arranged for contacting said combustion gas with an aqueous cooling media to form a mixture of steam and a cooled combustion gas;

a compound separating structure disposed in said internal volume to separate said alkaline compounds from said cooled combustion gas to form an alkaline-reduced gas, said compound separating structure comprising a down-coming tube in fluid contact with said inlet and through which said cooled combustion gas passes, said cooling structure being disposed within a space defined by said down-coming tube, said down-coming tube being constructed and arranged such that said separated alkaline compounds fall into a receiving liquor contained in said first internal vessel, said receiving liquor being formed at least in part from said separated alkaline compounds, said down-coming tube having an opening through which said cooled combustion gas passes that is disposed above a surface of said receiving liquor;

quenching structure to quench said alkaline-reduced gas with an aqueous washing bath, said quenching structure comprising a walled quenching structure defining a down-coming cavity fluidly connected to said opening of said down-coming tube and opening below a surface of said aqueous washing bath contained in said second internal vessel such that said alkaline-reduced gas is forced to pass down through a surface of said aqueous washing bath to produce a quenched, alkaline-reduced gas, said walled quenching structure being constructed and arranged such that said quenched, alkaline-reduced gas exits said aqueous washing bath outside said down-coming cavity and flows into a portion of said internal volume disposed above said aqueous washing bath and outside of said down-coming cavity;

second cooling structure constructed and arranged within said down-coming cavity for contacting said alkaline-reduced gas with an aqueous washing liquid prior to said alkaline-reduced gas contacting said aqueous washing bath and being constructed and arranged to avoid diluting said receiving liquor with said aqueous washing liquid; and an outlet from said portion of said internal volume through which said quenched, alkaline-reduced gas can exit said internal volume.

* * * * *